July 18, 1939. D. C. DRILL 2,166,400
APPARATUS FOR MAKING MINERAL WOOL
Filed Sept. 30, 1937 3 Sheets-Sheet 1
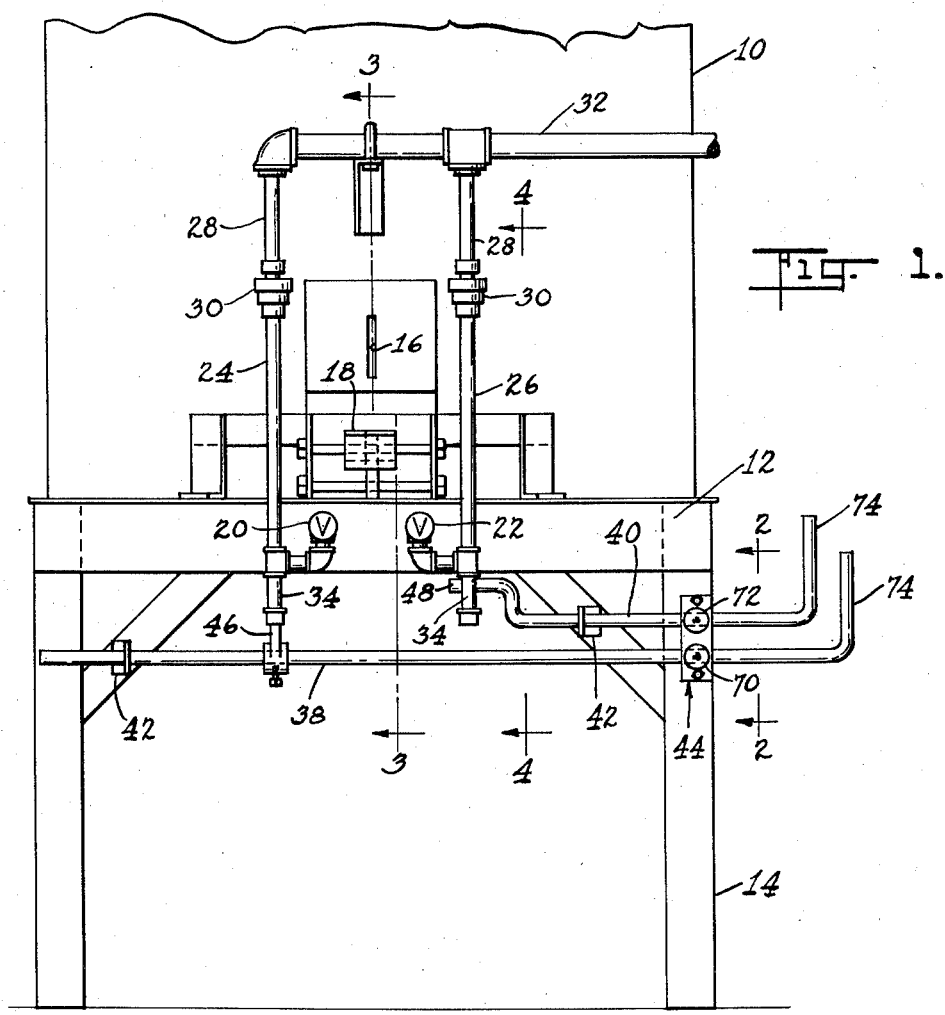
Daniel C. Drill
INVENTOR
BY Carlton C. Davis
ATTORNEY July 18, 1939. D. C. DRILL 2,166,400
APPARATUS FOR MAKING MINERAL WOOL
Filed Sept. 30, 1937 3 Sheets-Sheet 2
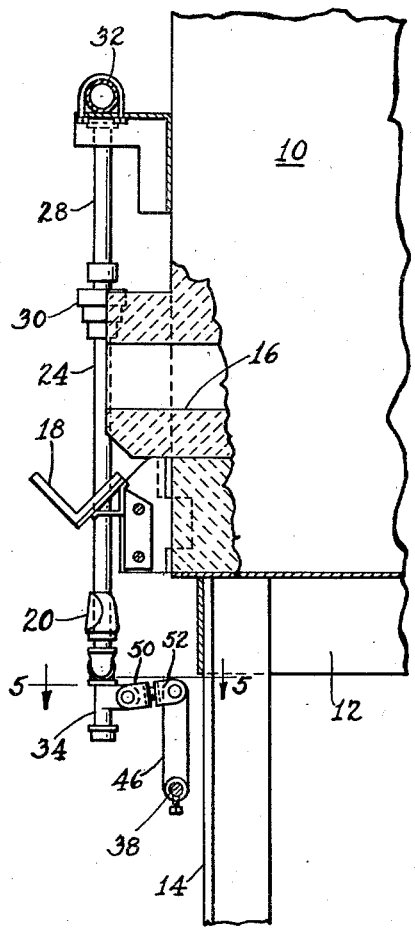
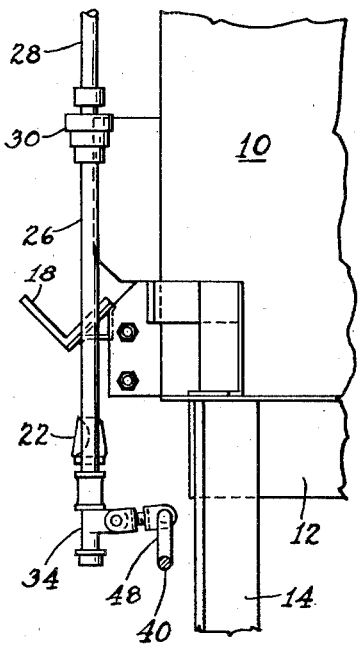
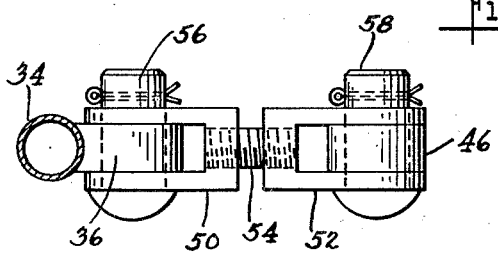
Daniel C. Drill
INVENTOR
BY Carlton C. Davis
ATTORNEY Patented July 18, 1939

2,166,400

UNITED STATES PATENT OFFICE 2,166,400

APPARATUS FOR MAKING MINERAL WOOL

Daniel C. Drill, Wabash, Ind., assignor to American Rock Wool Corporation, Wabash, Ind., a corporation of Indiana Application September 30, 1937, Serial No. 166,701

10 Claims. (Cl. 83—91)

This invention relates generally to improvements in apparatus for the manufacture of mineral wool, and more particularly to an improved apparatus for adjustably positioning a nozzle or blow cap relatively to a stream of molten materials flowing from a melting furnace, whereby a jet of air or steam emitting from the nozzle may be properly directed against the stream of molten materials for shredding the stream of molten materials into the fine fibers known as mineral wool.

An object of the present invention is to provide an improved and novel apparatus for adjustably positioning a nozzle relatively to a stream of molten materials flowing from a melting furnace, whereby a jet of gaseous fluid such as air or steam emitting from the nozzle may be directed against the stream of molten materials and utilized with the maximum efficiency for shredding the stream of molten materials into mineral wool fibers.

A further object of this invention is to provide an improved and novel apparatus whereby a nozzle may be adjustably positioned relatively to a stream of molten materials flowing from a furnace, which may be quickly and easily operated with a minimum of time and inconvenience.

Another object of the present invention is to provide an improved and novel apparatus whereby a nozzle may be adjustably positioned relatively to a stream of molten materials flowing from a melting furnace, which is sensitive in control and positive in operation.

A further object is to provide an improved and novel apparatus whereby a nozzle may be adjustably positioned relatively to a stream of molten materials flowing from a furnace, which is simple and sturdy in construction.

Other objects and advantages will be apparent from the following description.

In the drawings illustrating the invention:

Figure 1 is a fragmentary front elevation of a melting furnace showing the nozzles or blow-caps for shredding streams of the molten materials into fibers, and the apparatus for adjustably positioning the nozzles;

Figure 2 is a vertical sectional view taken along the line 2—2 of Figure 1;

Figure 3 is a vertical sectional view taken substantially along the line 3—3 of Figure 1;

Figure 4 is a vertical sectional view taken substantially along the line 4—4 of Figure 1;

Figure 5 is an enlarged horizontal sectional detail view taken substantially along the line 5—5 of Figure 3;

Figure 6:
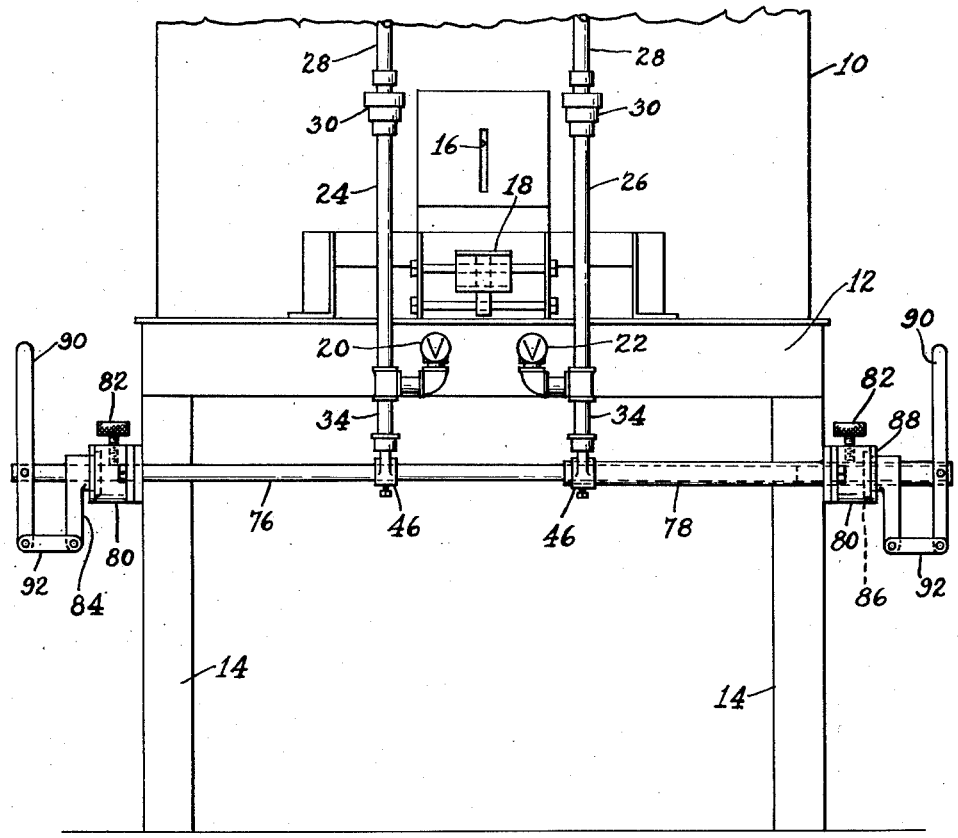
Figure 6 is an elevational view similar to Figure 1, illustrating another embodiment of the present invention.

In the embodiment selected to illustrate the invention, as shown in Figure 1, a furnace or cupola 10 is provided in which materials, such as slag or rock, are melted. The furnace 10 is mounted on a base 12 which is supported by standards or legs 14.

The furnace 10 is provided with an opening 16 therein through which a stream of the molten materials flows when the furnace is in operation. Positioned beneath the exterior orifice of the opening 16 is an angle shelf or trough 18 which is supported in any suitable manner such as by being connected with the furnace 10 or the base 12.

The stream of molten materials flowing from the opening 16 in the furnace drops on the shelf 18, and is divided into smaller streams which flow from the ends of the shelf.

Positioned below the shelf 18 at each end thereof are nozzles or blow-caps 20 and 22 which are connected by pipe fittings to movable supply pipes 24 and 26, respectively. The movable supply pipes 24 and 26 are swingably connected with stationary supply pipes 28 by gas tight universal joint fittings 30 which are of standard construction, and, therefore, have not been illustrated in detail. The stationary supply pipes 28 are connected with a line pipe 32 which is in communication with a source of supply of high pressure gaseous fluid such as air or steam. The gaseous fluid under pressure flows from the line pipe 32 through the pipes 28, the universal joint fittings 30, and the pipes 24 and 26, to the nozzles 20 and 22 from which it is directed in jets against the streams of molten materials falling from the shelf 18 for shredding the streams of molten materials into mineral wool fibers.

The nozzles 20 and 22 are disposed in a general position directly behind the streams of molten materials dropping from the shelf 18, whereby the jets of air or steam emitting therefrom may be directed against the streams of molten materials for shredding them into fibers.

It is important, however, that the nozzles be movable laterally relatively to the streams of molten materials, as the positions on the shelf 18 from which the streams drop frequently change due to obstructions or accumulations of solidified materials deposited on the shelf, which interfere with and change the direction of flow of the streams of molten materials. The movability of the nozzles is provided for by the universal connections for connecting the pipes 24 and 26 with the pipes 28.

The following description discloses the mechanism provided for adjustably positioning the nozzles relatively to the streams of molten materials and for retaining the nozzles in the desired positions.

As shown in Figures 1, 3, 4, and 5, an extension pipe 34 is connected with each of the nozzles and its respective movable supply pipe by one of the fittings for connecting the nozzle and the supply pipe, and is provided with a rearwardly extending projecting portion 36 which may be integral therewith. The lower ends of the extension pipes are closed by any suitable means such as plugs or caps.

Actuating members or rods 38 and 40 are movably mounted on the structure for supporting the furnace and are operatively connected with the extension pipes 34 for adjustably positioning the nozzles 20 and 22, respectively.

The actuating members 38 and 40 are slidably and rotatably mounted in bearing members 42 carried by the supporting structure and extend through a locking device 44 which is shown in Figures 1 and 2 as being connected with a supporting leg 14 of the furnace 10 comprising a part of the supporting structure.

As shown in Figures 1, 2, and 3, an arm 46 is connected with the actuating member 38 and extends upwardly behind the pipe extension 34 associated with the nozzle 20, and the actuating member 40 is provided with an offset end portion or arm 48 integral therewith which extends behind the pipe extension 34 associated with the nozzle 22.

The arm 46 of the actuating member 38, and the offset portion 48 of the arm 40, are operatively connected with the projecting portions 36 of the extension pipes 34 associated with the nozzles 20 and 22, respectively, by means of a pair of U-shaped members 50 and 52 which are rotatable with respect to each other and are connected at their bases by a threaded element 54.

The threaded element 54 is fixedly positioned with respect to one of the U-shaped members such as by being swaged therein, and is rotatable in a threaded opening in the other U-shaped member. This construction retains the U-shaped members in spaced positions and in alignment with the threaded element and provides for quickly and easily replacing the several parts.

The U-shaped member 52 is pivotally connected with the projecting portion 36 of the pipe extension 34 by means of a pin 56 having a cotter pin in the end thereof, and the U-shaped member 52 is pivotally connected with the arm 46 by means of a pin 58 having a cotter pin in the end thereof, for operatively connecting the actuating rod 38 with the nozzle 20.

In connecting the actuating arm 40 with the U-shaped member 52, however, the arm 46 and the pin 58 are dispensed with, and the offset portion 48 of the actuating arm 40 extends through the openings in the U-shaped member 52 in lieu of pin 58, and is retained in pivotal connection with the U-shaped member 52 by a cotter pin through the end of the offset portion 48 for operatively connecting the actuating member 40 with the nozzle 22.

As shown in Figure 2, the locking device 44 through which the actuating members or rods 38 and 40 extend, comprises a base block 60 having spaced apart recesses 61 therein for receiving slidable blocks 62. A cover plate 64 is disposed on the base block 60 and is connected therewith by any suitable means such as bolts 66 which also extend through openings in the base block for connecting the block with the supporting structure.

The cover plate is provided with pins 68 positioned on opposite sides of the slidable blocks 62 for retaining the slidable blocks within the recesses 61 in the base block 60.

The slidable blocks 62 and the base block 60 are provided with complementary arcuate shaped recesses for receiving the actuating members 38 and 40 therein.

The cover plate 64 is provided with threaded openings for receiving hand set screws 70 and 72 which extend through the cover plate 64 and engage the slidable blocks 62 for locking the actuating members 38 and 40 in fixed positions.

As best shown in Figure 2, when the hand set screws are tight for gripping the actuating members 38 and 40 between the base block 60 and the slidable blocks 62, said blocks are in spaced positions and thereby provided a positive gripping action of the blocks on the actuating members.

It will be noted that the hand set screw 70 is longer than the hand set screw 72 in order that one will not interfere with the operation of the other.

As shown in Figure 1, the actuating members 38 and 40 are provided with handle portions 74 whereby the members may be operated, and it will be noted that the handle portion of the actuating member 38 is farther removed from the locking device 44 than is the handle of the actuating member 40 in order that the operation of one member will not be interfered with by the other actuating member.

The following description illustrates the operation of the structure hereinbefore described.

When it is desired to change the position of a nozzle, such as, for instance, the nozzle 20, the hand set screw 70 is turned for releasing the gripping action on the actuating member 38 so that the actuating member may be moved longitudinally of its axis or rotated thereon, each movement of the actuating member being accompanied by a corresponding movement of the nozzle 20. When the handle 74 of the actuating member 38 is moved toward or away from the locking device 44, the nozzle 20 is, accordingly, moved toward or away from the nozzle 22, and when the handle is moved forwardly or backwardly with respect to the furnace, the nozzle 20 is also moved forwardly or backwardly. After the nozzle 20 is disposed in the desired position, the hand set screw 70 is turned oppositely for retaining the actuating member 38 against further movement and fixedly retaining the nozzle 20 in the selected position.

The actuating member 40 is operable in a similar manner for adjustably positioning the blow-cap or nozzle 22.

Figure 7:
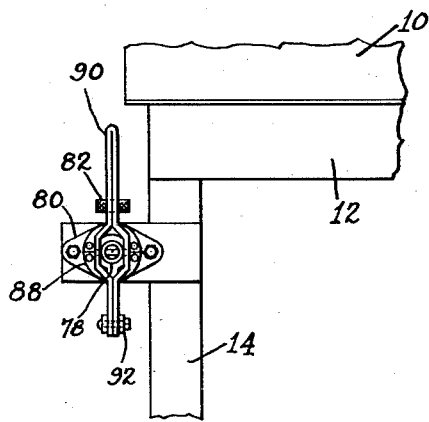
Figure 7 is an end elevation of a portion of the structure shown in Figure 6.

Figures 6 and 7 illustrate another embodiment of the present invention in which the parts identical with those hereinbefore described have been given the same reference characters.

As shown in Figure 6, a shaft actuating member 76 and a tubular actuating member 78 are disposed in telescopic relationship and extend through oppositely disposed bearing supporting members 80 fixedly mounted on the legs 14 of the furnace supporting structure.

The actuating members 76 and 78 are each provided with an arm 46 fixedly connected therewith for being operatively connected with the nozzles 20 and 22, respectively, in the manner hereinbefore described.

The actuating members are slidable and rotatable with respect to each other and also with respect to the bearing supporting members through which they extend. The bearing supporting members 80, however, are provided with hand set screws 82 for retaining the actuating members 76 and 78 in fixed positions.

A rotary arm 84 is mounted on each of the actuating members 76 and 78, and the actuating members are slidable therethrough.

The rotary arms 84 may be rotatably connected with the bearing supporting members 80 in any suitable manner such as by having an annular flange portion 86 receivable in a corresponding recess in the bearing supporting members and retained therein by retaining plates 88 fixedly connected with the bearing supporting members.

An actuating handle 90 is provided for each of the actuating members 76 and 78. The actuating handles are pivotally connected with the extreme or outer end portions of the actuating members and are operatively connected with the respective rotary arms 84 by connecting links 92.

The operation of the apparatus illustrated in Figures 6 and 7 is similar to that hereinbefore described for the structure illustrated in the other figures of the drawings.

When it is desired to change the positions of the nozzles 20 and 22 relatively to the streams of molten materials with which they are associated, the hand set screws 82 are turned for releasing the actuating members 76 and 78. The lever handles may then be moved toward or away from the bearing supports 80 for moving the nozzles 20 and 22 to the left or right when viewed from the front, as in Figure 6.

The movement of the handles causes the actuating members to slide through the bearing supports 80, the rotary arms 84, and relatively to each other.

The nozzles 20 and 22 are moved toward or away from the furnace by turning or swinging the actuating handles 90 in the corresponding direction for rotating the actuating members in the same direction. It will be noted that when the actuating handles 90 are turned for rotating the actuating members 76 and 78, the arms 84 are rotated with respect to the bearing supports 80, with which they are rotatably connected. When the nozzles are disposed in the desired positions relatively to the streams of molten materials, the hand set screws may again be set for retaining the nozzles in their selected positions.

Thus it will be seen from the foregoing description that an apparatus is provided for adjustably positioning the nozzles, which is simple in construction, may be quickly and easily operated, and is positive in operation and control.

Modifications and changes may be made without departing from the spirit of the invention, and it is intended that this invention shall be limited only by the scope of the appended claims.

I claim:

1. An attachment for a melting furnace comprising a movable pipe, a nozzle connected with the movable pipe and positioned for directing a jet of gaseous fluid on a stream of molten materials flowing from the furnace for shredding the stream of molten materials into fibers, an actuating member, means for supporting the actuating member, said actuating member being slidably and rotatably mounted in the supporting means, an arm fixedly connected with the actuating member, and means for operatively connecting the arm with the nozzle whereby the nozzle may be adjustably positioned relatively to the stream of molten materials when the actuating member is moved, said means comprising a pair of pivotal elements, one of said elements being pivotally connected with the nozzle and the other element being pivotally connected with the arm.

2. An attachment for a melting furnace comprising a movable pipe, a nozzle connected with the movable pipe and positioned for directing a jet of gaseous fluid on a stream of molten materials flowing from the furnace for shredding the stream of molten materials into fibers, an actuating member, means for supporting the actuating member, said actuating member being slidably and rotatably mounted in the supporting means, an arm fixedly connected with the actuating member, means for operatively connecting the arm with the nozzle whereby the nozzle may be adjustably positioned relatively to the stream of molten materials when the actuating member is moved, said means comprising a pair of pivotal elements, one of said elements being pivotally connected with the nozzle and the other element being pivotally connected with the arm, and means for pivotally connecting the elements whereby said elements may be positioned in axial alignment and rotatable with respect to each other.

3. An attachment for a melting furnace comprising a movable pipe, a nozzle connected with the movable pipe and positioned for directing a jet of gaseous fluid on a stream of molten materials flowing from the furnace for shredding the stream of molten materials into fibers, an actuating member, means for supporting the actuating member, said actuating member being slidably and rotatably mounted in the supporting means, an arm fixedly connected with the actuating member, and means for operatively connecting the arm with the nozzle whereby the nozzle may be adjustably positioned relatively to the stream of molten materials when the actuating member is moved, said means comprising a pair of pivotal elements, one of said elements being pivotally connected with the nozzle and the other element being pivotally connected with the arm, the axes of said pivotal connections being substantially parallel with the axis of said actuating member.

4. An attachment for a melting furnace comprising a movable pipe, a nozzle connected with the movable pipe and positioned for directing a jet of gaseous fluid on a stream of molten materials flowing from the furnace for shredding the stream of molten materials into fibers, an actuating member, means for supporting the actuating member, said actuating member being slidably and rotatably mounted in the supporting means, an arm fixedly connected with the actuating member, means for operatively connecting the arm with the nozzle whereby the nozzle may be adjustably positioned relatively to the stream of molten materials when the actuating member is moved, said means comprising a pair of pivotal elements, one of said elements being pivotally connected with the nozzle and the other element being pivotally connected with the arm, and means for pivotally connecting the elements whereby said elements may be positioned in axial alignment and rotatable with respect to each other, the pivotal axes of said connecting elements with each other being in transverse relationship relatively to the pivotal axes of the connecting elements with the nozzle and the arm.

5. An attachment for a melting furnace comprising a movable pipe, a nozzle connected with the movable pipe and positioned for directing a jet of gaseous fluid on a stream of molten materials flowing from the furnace for shredding the stream of molten materials into fibers, an actuating member, means for supporting the actuating member, said actuating member being slidably and rotatably mounted in the supporting means, an arm fixedly connected with the actuating member, means for operatively connecting the arm with the nozzle whereby the nozzle may be adjustably positioned relatively to the stream of molten materials when the actuating member is moved, said means comprising a pair of pivotal elements, one of said elements being pivotally connected with the nozzle and the other element being pivotally connected with the arm, and means for pivotally connecting the elements whereby said elements may be positioned in axial alignment and rotatable with respect to each other, said last named means comprising a threaded element fixedly connected with one of the pivotal elements and rotatably disposed in a threaded opening in the other pivotal element.

6. An attachment for a melting furnace comprising a movable pipe, a nozzle connected with the movable pipe and positioned for directing a jet of gaseous fluid on a stream of molten materials flowing from the furnace for shredding the stream of molten materials into fibers, a slidable and rotatable actuating member, means for operatively connecting the actuating member with the nozzle for adjustably positioning the nozzle relatively to the stream of molten materials when the actuating member is moved, a bearing member for supporting the actuating member, a rotary arm mounted on the actuating member and rotatably connected with the bearing member, said actuating member being slidable and rotatable with respect to the bearing member and slidable with respect to the arm, and an actuating lever pivotally connected with an end of the actuating member and operatively connected with the rotary arm for operating said actuating member.

7. An attachment for a melting furnace comprising a movable pipe, a nozzle connected with the movable pipe, and positioned for directing a jet of gaseous fluid on a stream of molten materials flowing from the furnace for shredding the stream of molten materials into fibers, a slidable and rotatable actuating member, means for operatively connecting the actuating member with the nozzle for adjustably positioning the nozzle relatively to the stream of molten materials when the actuating member is moved, a bearing member for supporting the actuating member, a rotary arm mounted on the actuating member and rotatably connected with the bearing member, said actuating member being rotatable and slidable in the bearing member and slidable in the rotary arm, an actuating lever pivotally connected with an end of the actuating member, and a link element pivotally connected with the actuating lever and the rotary arm whereby the actuating member may be moved when the actuating lever is moved.

8. An attachment for a melting furnace comprising a pair of movable pipes, a nozzle connected with each of the movable pipes for directing a jet of gaseous fluid on each of two streams of molten materials for shredding said streams of molten materials into fibers, a pair of actuating members comprising an actuating rod member and an actuating tubular member disposed in telescopic relationship, said actuating members being slidable and rotatable with respect to each other, and means for operatively connecting each of the actuating members with a nozzle for adjustably positioning each of the nozzles relatively to a stream of the molten materials independently of the other nozzle.

9. An attachment for a furnace comprising a pipe, a movable nozzle connected to the pipe and positioned for directing a jet of gaseous fluid on a stream of molten materials flowing from the furnace for shredding the stream of molten materials into fibers, an actuating member, means for supporting the actuating member, said actuating member being rotatable and longitudinally slidable relatively to the supporting means, and means for operatively connecting the actuating member with the nozzle for adjustably positioning the nozzle relatively to the stream of molten materials when the actuating member is rotatably or slidably moved.

10. An attachment for a furnace comprising a pipe, a movable nozzle connected to the pipe and positioned for directing a jet of gaseous fluid on a stream of molten materials flowing from the furnace for shredding the stream of molten materials into fibers, an actuating member, means for supporting the actuating member, said actuating member being rotatable and longitudinally slidable relatively to the supporting means, means for operatively connecting the actuating member with the nozzle for adjustably positioning the nozzle relatively to the stream of molten materials when the actuating member is moved, and an operating lever pivotally connected to the actuating member and operatively connected to the supporting means for moving the actuating member and adjustably positioning the nozzle.

DANIEL C. DRILL.